Patented Nov. 1, 1938

2,135,447

UNITED STATES PATENT OFFICE 2,135,447

ESTER SYNTHESIS PROCESS

John C. Woodhouse, Cragmere, Del., assignor to E. I. du Pont de Nemours & Company, Wilmington, Del., a corporation of Delaware No Drawing. Application April 23, 1936, Serial No. 76,018

10 Claims. (Cl. 260—496)

This invention relates to a process for the preparation of organic esters and more particularly to the preparation of aliphatic organic esters by the condensation of aliphatic organic ethers with carbon monoxide in the presence of a volatile halide and activated carbon. This application is in part a continuation of U. S. Patent 2,053,233.

It is known that many compounds which have slight, if any, catalytic activity for a particular reaction can be made into a highly active catalyst therefor by the use of a suitable promoter. Thus, nickel, which is but a mediocre catalyst under the usual operating conditions for the preparation of hydrogen by the interaction of methane and steam, can be made highly active therefor by promoting it with alumina. Many organic reactions, however, are not operable upon a commercial scale even with promoted catalysts, and others in commercial use are being constantly investigated to improve the catalyst. Particularly is this true of the following reactions when conducted in the vapor phase:

(1) $CO + ROH \rightarrow RCOOH$ and/or $HCOOR$
(2) $CO + C_nH_{2n} + H_2O \rightarrow$ aliphatic acids
(3) $CO + RH + Cl_2 \rightarrow RCOCl + HCl$
(4) $CO + R_2O \rightarrow RCOOR$
(5) $CO + RCl \rightarrow RCOCl$
(6) $CO + H_2 \rightarrow HCHO$ and/or $CH_3OH$
(7) $CO + RH \rightarrow RCHO$
(8) $C_nH_{2n} + CO_2 \rightarrow C_nH_{2n-1}COOH$
(9) $Cl_2 + COH + H_2O \rightarrow$ Chlor acids (among other products)
(10) $C_nH_{2n-2} + CO_2 \rightarrow C_nH_{2n-3}COOH$
(11) Dimerization and antioxidation of beta arylacrylic acids.
(12) $ClROR + CO \rightarrow RORCOCl$
(13) $ClROR + C_nH_{2n} \rightarrow ClC_nH_{2n}ROR$ In the above reactions R indicates hydrogen, alkyl, aryl, or aralkyl grouping. Thus, in reaction (1), by substituting the alkyl, $CH_3$, for R, methanol is indicated as reacting with the CO to form acetic acid or methyl formate. In reaction (4) by substituting the alkyls,—methyl, ethyl and propyl for R, dimethyl ether, diethyl ether and dipropyl ether are indicated as reacting with carbon monoxide to form methyl acetate, ethyl propionate, and propyl butyrate. In reaction (7) by substituting the aryl, $C_6H_5$, for R,—benzene is indicated as reacting with CO to form benzaldehyde. In reaction (2) if ethylene were the olefinic hydrocarbon used propionic acid would be the acid obtained, in (8) with ethylene as the olefine acrylic acid is obtained, in (10) with acetylene, tetrolic acid is the product, and in (11) trans-cinnamic acid yields alpha truxillic acid and benzaldehyde. In the condensation reaction (12) if R designates methyl, monochlormethyl ether is converted to methoxy acetyl chloride, and in (13) by a similar substitution and with ethylene as the olefine, gammachlormethyl ether is obtained. By the substitution of other appropriate compounds in these reactions, it will be appreciated by those skilled in the art that many important products are indicated.

An object of the present invention is to provide a new and improved process for the preparation of esters. Another object of the invention is to provide a process for the preparation of aliphatic organic esters by the condensation of aliphatic organic ethers with carbon monoxide. A still further object of the invention is to provide a new and improved catalyst for the condensation of ethers and carbon monoxide to give esters. Yet another object of the invention is to provide volatile halides and activated carbon as catalysts for the reactions. Other objects and advantages will hereinafter appear.

I have found that various organic reactions, such as those described above, as examples, can be accelerated by conducting the reacting constituents over activated charcoal which contains an adsorbed hydrogen and/or ammonium halide. This catalyst is surprisingly more active than charcoal or a halide used alone for the same purpose, and in many reactions when used separately there is no appreciable activity, but when combined, in accord with my invention, excellent activity is obtained. This combination catalyst is especially well adapted for the condensation of ethers with carbon monoxide to form esters and other alkacyl compounds. The symmetrical and unsymmetrical ethers may if desired be employed such, for example, as dimethyl ether, methyl ethyl ether, diethyl ether, ethyl propyl ether, dipropyl ether, dibutyl ether, as well as higher symmetrical and unsymmetrical ethers.

The catalyst can be prepared by many different processes. For example, activated charcoal may be saturated with a strong aqueous ammonium halide solution, and in this condition, is placed in a reaction chamber for the preparation of propionic acid from ethylene, CO, and water. An initial high yield of propionic acid will be obtained under the usual conditions of operating such reactions, e. g., at from 200–400° C., and 25–900 atmospheres or higher, and by injecting into the reactants an aqueous solution of the ammonium halide, substantially the initial high activity of the catalyst can be maintained over an indefinite period. The catalyst may be employed in reactions designated above under (1) by injecting into the carbon monoxide and the alcohol a hydrogen halide or an ammonium halide and passing the resulting gaseous mixture over active carbon. Other gaseous reactions may be catalyzed in a reaction chamber wherein active carbon or activated charcoal is maintained in an atmosphere of a volatile halide.

I have found that not only the volatile halides themselves, but also compounds which form them or decompose under the conditions existing during the reaction to produce them, may be used. The volatile halides or compounds that form them, which I have found suitable for use in conjunction with the active carbon, include: hydrogen chloride, hydrogen bromide, hydrogen fluoride, hydrogen iodide; the chlorides, bromides, and iodides of ammonia; the halogen amines such as chloramine, etc.; and the alkyl halides,— ethyl chloride, methyl bromide, etc; the volatile nonmetal halides such as sulfuryl chloride, boron fluoride, phosphoryl chloride etc.

Whether the halide is adsorbed in the carbon, or the carbon in an atmosphere of the volatile halide, is responsible for the activity of this catalyst is not definitely known. The high adsorbing characteristics of the active carbon and its ability, theoretical at least, to orient organic compounds upon its surface, in which condition they are, apparently, readily acted upon by the halide constituent of my catalyst, is believed, however, to be in no small measure responsible for its activity. There is, on the other hand, a possibility that the excellent activity of this two component catalyst is due to the halide coexisting as an atmosphere above, as well as being adsorbed upon the carbon. This theoretical consideration will in no way limit the scope of the invention and is given in order that a fuller concept of the apparent operation of this type of catalyst may be realized by those skilled in this art.

Although my invention is susceptible of variation as to details of procedure employed, the following examples will illustrate several of the large number of reactions in which my catalyst may be employed.

*Example 1.*—A gaseous mixture was prepared containing by volume 95% carbon monoxide, and 5% ethylene, together with steam, to give a steam: carbon monoxide ratio of approximately 0.25, the steam being derived from the injection of an appropriate amount of a 1% aqueous solution of ammonium chloride to give this steam:gas ratio. The resulting gaseous mixture was passed into a conversion chamber designed for carrying out exothermic gaseous reactions and in which activated charcoal was disposed. The temperature of the reaction was maintained at approximately 325° C., while the pressure was held at approximately 700 atmospheres. A 75% yield of propionic acid was obtained together with other aliphatic acids.

*Example 2.*—A gaseous mixture, containing 85% carbon monoxide, 5% each of methanol, water vapor, and hydrogen is passed together with approximately 1% ammonium chloride over activated charcoal which is disposed in a conversion chamber suitable for the carrying out of exothermic gaseous reactions. The reaction is conducted at a temperature of approximately 325° C., and a pressure of approximately 700 atmospheres. Upon condensation of the products of the reaction a good yield of acetic acid is obtained together with a small amount of other aliphatic acids.

*Example 3.*—A gaseous mixture containing 90 parts by volume of carbon monoxide, 18 parts by volume of steam, and 2 parts by volume of hydrogen iodide will react when passed over active carbon at a pressure of approximately 700 atmospheres and a temperature of 325° C., to give formic acid, upon condensation of the reaction products.

*Example 4.*—A gaseous mixture, containing 80% carbon monoxide, and 5% each of methanol, water, and hydrogen, is passed together with approximately 5% hydrogen chloride over active carbon which is disposed in a conversion chamber suitable for the carrying out of exothermic gaseous reactions. The reaction is conducted at 325° C., and a pressure of 700 atmospheres. Acetic acid is obtained upon condensation of the reaction products.

*Example 5.*—A gaseous mixture, containing 80% carbon monoxide, and 5% each of methanol, water vapor, and hydrogen, is passed together with approximately 5% hydrogen chloride over active carbon which is disposed in a conversion chamber suitable for the carrying out of exothermic gaseous reactions. The reaction is conducted at 325° C., and a pressure of 700 atmospheres. Acetic acid is obtained upon condensation of the reaction products.

*Example 6.*—A gaseous mixture, containing 100 parts of carbon monoxide, and 5 parts of dimethyl ether was passed together with approximately 1 part of hydrogen chloride over activated charcoal which was disposed in a converted chamber suitable for the carrying out of exothermic gaseous reactions. The reaction was conducted at a temperature between 275 and 375° C., and a pressure of approximately 700 atmospheres. Upon condensation of the products of the reaction 27.0% of methyl acetate calculated on the total volume of the condensate was obtained.

*Example 7.*—A gaseous mixture comprising 100 parts of carbon monoxide, 5.1 parts of dimethyl ether, 0.52 part of hydrogen chloride, and 10 parts of water was passed over activated charcoal disposed in a suitable conversion chamber. The reaction was conducted at a temperature of approximately 325° C., and a pressure of approximately 700 atmospheres. The products were condensed and were found to contain 6.7 volume per cent of methyl acetate.

The operating conditions employed for condensing aliphatic ethers with carbon monoxide are substantially identical with the conditions employed for condensing these compounds with other type catalysts and in general satisfactory operating conditions include temperatures ranging between 200 and 400° C., and pressures ranging from 25 to 700 atmospheres.

It has been proposed to catalyze various organic vapor phase reactions by means of metallic halides or sulphates supported upon a porous material, such as silica gel, activated charcoal, etc. By conducting the reaction in accord with this invention, however, and employing with the gaseous reactants a volatile halide I have found that a higher average space-time-yield is obtainable over extended periods of operation without the presence of a metallic halide or sulfate present on the activated charcoal. The advantages to be derived from using activated charcoal per se over charcoal promoted with a metallic halide or sulfate are many. For example, it is not expensive to prepare; does not require frequent replacement; and is readily available.

From a consideration of the above disclosure, it will be realized that many changes may be made in the reactants and conditions used without departing from the invention or sacrificing any of its advantages.

I claim:

1. In a process for the preparation of an aliphatic organic ester conducted at elevated temperatures and elevated pressures the step which comprises reacting an aliphatic organic ether with carbon monoxide in the presence of active carbon and a volatile halide of the group consisting of hydrogen chloride, hydrogen bromide, hydrogen fluoride, hydrogen iodide, the chlorides, bromides, and iodides of ammonia, chloramine, ethyl chloride, methyl bromide, sulfuryl chloride, boron fluoride, and phosphoryl chloride as the catalyst.

2. In a process for the preparation of an aliphatic organic ester conducted at elevated temperatures and elevated pressures the step which comprises reacting a symmetrical aliphatic organic ether with carbon monoxide in the presence of active carbon and a volatile halide of the group consisting of hydrogen chloride, hydrogen bromide, hydrogen fluoride, hydrogen iodide, the chlorides, bromides, and iodides of ammonia, chloramine, ethyl chloride, methyl bromide, sulfuryl chloride, boron fluoride, and phosphoryl chloride as the catalyst.

3. In a process for the preparation of an aliphatic organic ester conducted at elevated temperatures and elevated pressures the step which comprises reacting an unsymmetrical aliphatic organic ether with carbon monoxide in the presence of active carbon and a volatile halide of the group consisting of hydrogen chloride, hydrogen bromide, hydrogen fluoride, hydrogen iodide, the chlorides, bromides, and iodides of ammonia, chloramine, ethyl chloride, methyl bromide, sulfuryl chloride, boron fluoride, and phosphoryl chloride as the catalyst.

4. Process according to claim 1 wherein the reaction is conducted at a temperature between 200 and 400° C.

5. Process in accord with claim 1 wherein the reaction is conducted at a pressure between 25 and 900 atmospheres.

6. In a process for the preparation of methyl acetate conducted at elevated temperatures and elevated pressures the step which comprises reacting dimethyl ether with carbon monoxide in the presence of active carbon and a volatile halide of the group consisting of hydrogen chloride, hydrogen bromide, hydrogen fluoride, hydrogen iodide, the chlorides, bromides, and iodides of ammonia, chloramine, ethyl chloride, methyl bromide, sulfuryl chloride, boron fluoride, and phosphoryl chloride as the catalyst.

7. In a process for the preparation of ethyl propionate conducted at elevated temperatures and elevated pressures the step which comprises reacting diethyl ether with carbon monoxide in the presence of active carbon and a volatile halide of the group consisting of hydrogen chloride, hydrogen bromide, hydrogen fluoride, hydrogen iodide, the chlorides, bromides, and iodides of ammonia, chloramine, ethyl chloride methyl bromide, sulfuryl chloride, boron fluoride, and phosphoryl chloride as the catalyst.

8. In a process for the preparation of aliphatic organic esters conducted at elevated temperatures and elevated pressures the step which comprises reacting in aliphatic organic ether with carbon monoxide in the presence of active carbon and a hydrogen halide.

9. In a process for the preparation of aliphatic organic esters conducted at elevated temperatures and elevated pressures the step which comprises passing an aliphatic organic ether, carbon monoxide, and a hydrogen halide over activated carbon.

10. A process for the preparation of methyl acetate which comprises contacting 100 parts of carbon monoxide and 5 parts of dimethyl ether with activated carbon while utilizing as the catalyst approximately 1 part of hydrogen chloride, the reaction being conducted at a temperature between 200 and 400° C., and under a pressure of from 25 to 900 atmospheres.

JOHN C. WOODHOUSE.